United States Patent

[11] 3,595,356

| | | | | |
|---|---|---|---|---|
| [72] | Inventors | Daniel Q. Boje<br>Fairfield;<br>Sol Kestin, Bronx, both of, N.Y. |
| [21] | Appl. No. | 821,741 |
| [22] | Filed | May 5, 1969 |
| [45] | Patented | July 27, 1971 |
| [73] | Assignee | Compactor Corporation |

[54] ADJUSTABLE CHUTE AND ACCESS DOOR
10 Claims, 3 Drawing Figs.
[52] U.S. Cl. .................................................. 193/15,
193/34, 302/9, 302/34, 285/424
[51] Int. Cl. .................................................. B65g 11/00
[50] Field of Search .......................................... 193/1, 2,
15, 22, 23, 27, 33, 34; 302/9, 34; 198/72, 73, 228;
98/115 UM; 285/121, 283, 424

[56] References Cited
UNITED STATES PATENTS

| 582,571 | 5/1897 | Ziegler ...................... | 193/27 |
| 974,483 | 11/1910 | Goodison .................... | 302/9 |
| 3,261,441 | 7/1966 | Mullens....................... | 193/33 |

Primary Examiner—Andres H. Nielsen
Attorneys—Harry G. Martin, Jr. and J. Raymond Curtin ABSTRACT: An adjustable chute assembly and access door therefor, comprising at least a pair of interconnected chute components, interconnected in such a manner that the widthwise dimensions of said chute assembly will always be constant said access door provided in one of said chute components to afford access into the interior of said chute assembly.

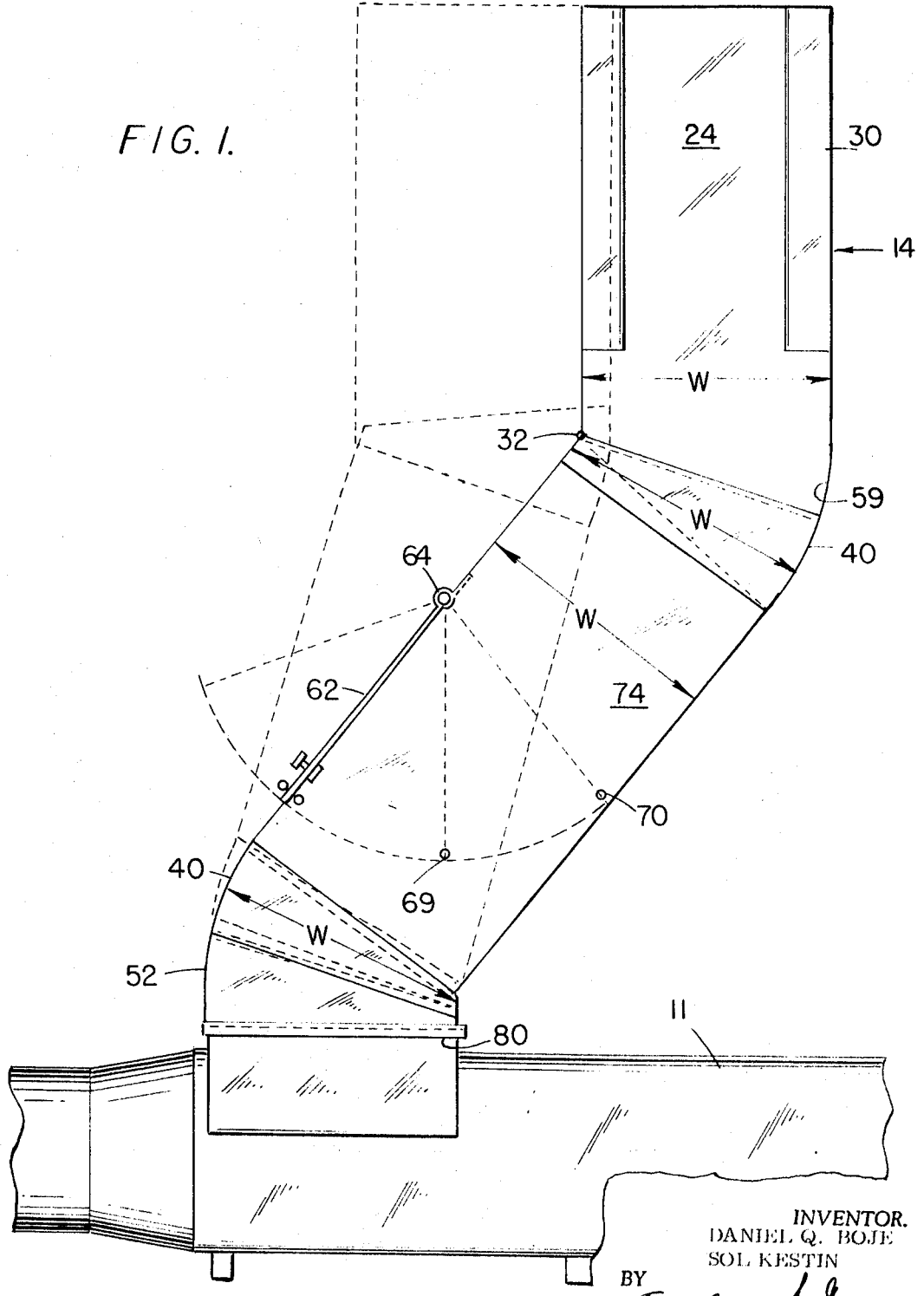

INVENTOR.
DANIEL Q. BOJE
SOL KESTIN
BY Friedman & Goodman
Attorneys ns 3,595,356

ADJUSTABLE CHUTE AND ACCESS DOOR

BACKGROUND OF THE INVENTION

1. Field of the Invention

This invention relates generally to a chute assembly and, more particularly, to an angularly adjustable chute assembly.

2. Description of the Prior Art

Various chute assemblies for the transfer of packages, boxes and waste material by gravitational means, are, of course, well known. In the case of a chute assembly for delivering packages, the chute is connected to an upper depository into which the packages are placed for transfer by gravity into a repository therefor provided on a desired lower level. Similarly, when the chute assembly is used in association with a waste compactor, waste is placed into the upper end of the chute for delivery into the compactor which is placed at the bottom of the chute. One of the problems that exists with these aforementioned chute assemblies is that it is not always possible to provide a perfectly vertical delivery the compactor which is placed at the bottom of the chute. One of the problems that exists with these aforementioned chute assemblies is that it is not always possible to provide a perfectly vertical delivery from depository to repository. In other words, many times the point of entry, for logistic reasons, for the chute must be located at a vertically displaced position from the point to which the articles in the chute must be ultimately delivered. Thus, the chute must be somehow angularly adjusted to provide for this displacement. However, one of the disadvantages that arises from this angular adjustment is that sharp corners are formed which vary the widthwise dimension of the chute, thereby causing a jam-up of the articles or waste at these points of varying dimension. Thus, the free-flowing operation of the chute assembly is prevented.

SUMMARY OF THE INVENTION

It is, therefore, among one of the principal objectives of the invention to provide an improved chute assembly, particularly suitable for use with a waste compactor, adapted to be substantially free flowing with relation to articles deposited therein and passing therethrough by means of gravity.

In accordance with the present invention there has now been provided an adjustable chute assembly and an access door therefor comprising at least a pair of interconnected chute components, interconnected in such a manner that the widthwise dimension of said chute assembly will always be constant, said access door being provided in one of said chute components to afford access into the interior of said chute assembly.

BRIEF DESCRIPTION OF THE DRAWING

The invention will be hereinafter more fully described with reference to the accompanying drawing in which:

FIG. 1 is a side view of the invention chute assembly, as illustrated in conjunction with a waste compacting device, shown fragmented, the various positions of the chute assembly shown by dotted lines.

DESCRIPTION OF THE SPECIFIC EMBODIMENTS

Figures 2, 3:
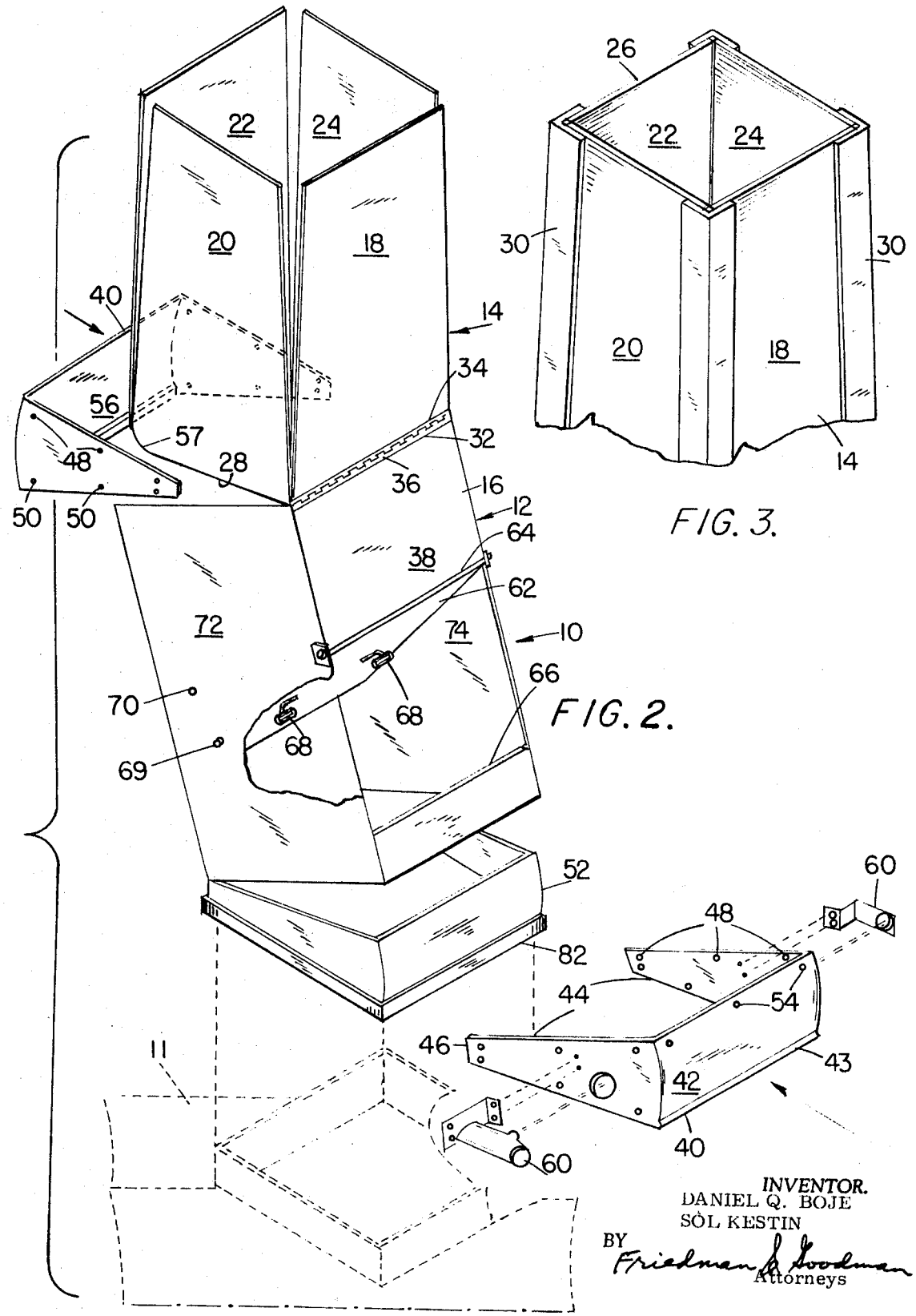
FIG. 2 is an exploded view in perspective showing the various parts of the chute assembly.
FIG 3 is a fragmented view in perspective showing the upper portion of the upper chute component of the assembly device.

Referring now to the figures of the drawing in detail, particularly to FIGS. 1 and 2, there is shown the invention angularly adjustable chute assembly 10 in working conjunction with a suitable waste compactor 11, such as described in U.S. Pat. No. 3,384,007 and comprising at least a pair of chute components 12 and 14, chute 12 being the lower chute and chute 14 being the upper chute. Chute assembly 10 is made of any suitable metal e.g., aluminum, steel or the like. Lower chute component 12 is a generally rectangular shaped open tube 16. While the upper chute 14 may similarly be a generally rectangular-shaped tube as shown in FIG. 1, it is preferably provided with upwardly tapering side walls 18, 20, 22 and 24, respectively, as shown FIG. 2, so that when assembled the area defined by the top 26 (FIG. 3) of the chute is smaller than the area that would be defined by the bottom 28 thereof. This tapering configuration provides for a greater ease of insertion into a suitable depository opening (not shown), the tapering effect providing for a tight fit with such depository opening. As shown by FIG. 3 chute component 14 is assembled by providing suitable right angle brackets 30 at each intersection of the four walls 18, 20, 22 and 24, respectively. The brackets may be secured by conventional means such as welding or bolting and the like and may be disposed in a similar manner on the generally rectangular shaped upper chute 14 of FIG. 1 as shown.

The upper and lower chutes are connected by means of a hinge 32 provided between the lowermost end 34 of a wall 18 and the uppermost end 36 of wall 38 of the lower chute 12. Thus, the upper and lower chutes are adapted to be hingedly movable about the axis provided by said hinge 32. Further, it can be seen that the two chutes when so connected are resultingly angularly adjustable with regard to each other. When the desired angle between the upper and lower chutes is selected, this angle is then fixed by providing a chute connecting member 40 in securing relation between the aforesaid chutes.

Each chute connecting member 40 comprises an outwardly curved front plate 42 having at each opposite end thereof and integrally merged therewith a pair of opposing parallel side plates 44. Each side plate 44 is of a tapered configuration terminating at its outer smaller end 46 into a flat vertical surface. A semiannular longitudinally oriented bead 43 is provided at the base of front plate 42 in integral relation therewith for a reason to be subsequently shown hereinbelow. A series of opposingly aligned bores 48 and 50, respectively, are provided on the side plates so that the connecting member 40 may be secured to the upper and lower chutes by means of threaded bolts or screws or the like. Another series of bores 54 is provided on front plate 42 opposing bead 43 which bores provide additional securing means for the connecting member. The bottom end 28 of chute 14 is adjustable along substantially the entire height of the inside wall 56 of face plate 42. In other words, the arc subtended by the curved face plate 42 provides the various angular positions that may be made between upper and lower chutes. The opposing bottom corners 57 and 59 of walls 20 and 24, respectively, may be rounded to aid in such positioning.

As shown in FIGS. 1 and 2 only one lower chute 12 is shown hingedly connected to the upper chute 14, however, it is to be understood that a number of chutes 12 could be similarly interconnected in opposing fashion depending on the height desired to be transversed. As hereinshown, lower chute 12 is the terminal chute and is connectable to a collar 52 adapted to fit over the entrance 80 into the waste compactor 11. Similarly, in the manner described above, another chute connecting member 40 can be provided to secure collar 52 to chute 12 in a desired angular arrangement, also as described above. Bead 43 is restable on the bottom rim 82 of the collar 52 if desired. Now, looking particularly at FIG. 1, it can be seen that the widthwise dimension "W" of the entire chute assembly is always constant, thereby eliminating the aforementioned prior art problems caused by varying interior dimensions and the resulting sharp connecting corners. It can also be seen by the dotted lines shown in FIG. 1 that the chute assembly may be aligned in a variety of angles, going from the acute angle shown by the solid lines of the lower chute to a more obtuse angle provided by the lower chute position in dotted lines. It can be seen that no matter what angle is obtained that the width "W" will always be constant throughout the entire chute assembly. When the chute of the invention is used with the waste compactor 11, for example, a conventional electric eye 60 can be provided on the lower connecting chute which will automatically start the compactor when waste material is passing through the chute and conversely will stop the compactor when there is no more waste passing therethrough.

A door 62 may be provided to afford access into the interior of the chute assembly if such access is desired for any reason, maintenance, etc. Door 62 is two-way hingedly connected to lower chute 12 as at 64 and is sized so that it will slidingly fit inside a rectangular opening 66 provided on the wall 38. At the lower end of door 64, a pair of opposing slideable bolts 68 are provided which are adapted to slidingly fit inside bores 69 and 70 provided on the sidewalls 72 and 74 of lower chute 12, respectively. Opposing bores 69 and opposing bores 70 are at different levels so that, for example, when the door 64 is placed with the slideable bolts 68 registered within the upper bore 70 the door will close off the chute substantially completely. Whereas, when registering bolts 68 respectively into lower bores 69 the door will only partially close the chute and resultingly slow up the discharge of articles therethrough. This is shown by the door positions denoted by dotted lines in FIG. 1. Thus, a means for controlling the flow of material through the chute is provided.

While, the present chute assembly is particularly suitable for use with a waste compactor, it has a wider utility than that, in that it can be used in any situation where it is desired to freely transport articles from one height to another.

What is claimed is:

1. An angularly adjustable chute assembly and access means therefore comprising at least a pair of interconnected chute components having a generally rectangular shape, said access means being provided in one of said chute components, said chute components including an upper chute component and a lower chute component, said chute components being adjacently disposed in opening relation, chute connecting means for angularly adjusting said chute components, said chute connecting means including an outwardly curved front plate defining a curved inner surface for engaging an outer surface of one of said chute components in selected various positions to obtain a predetermined angle between said chute components, a spaced apart pair of parallel opposing side plates provided at opposing ends of said front plate, each of said side plates being of a rearwardly tapering configuration to define a smaller free end having a flat vertical surface, and means for securing said front and side plates on outer surfaces of said upper and lower chute components with said chute connecting means being disposed between said upper and lower chute components to connect said upper and lower chute components at said predetermined angle.

2. A chute assembly according to claim 1, wherein said chute connecting means interconnect said upper and lower chute components in a manner such that the widthwise dimension of said chute assembly is constant.

3. A chute assembly according to claim 1, wherein means hingedly connect said upper chute component to said lower chute component in said opening relation along an adjacent wall of each of said upper and lower chute components, said hinge means being opposingly spaced apart from said front plate of said chute connecting means for cooperation therewith in connecting said upper and lower chute components at said predetermined angle.

4. A chute assembly according to claim 1, wherein said front plate of said chute connecting means is provided with semiannular longitudinally oriented bead means for resting on one of said chute components.

5. An angularly adjustable chute assembly and access means therefor comprising at least a pair of interconnected chute components, said chute components including an upper chute component and a lower chute component, said chute components being adjacently disposed in opening relation, chute connecting means for an angularly adjusting said chute components, said access means including an opening in one of said chute components and a dual direction hingedly connected door provided to slidingly fit inside said opening, said door being functionable simultaneously as a part of said access means and as means for controlling the flow of articles through said chute assembly.

6. A chute assembly according to claim 5, wherein said chute connecting means interconnect said upper and lower chute components in a manner such that the widthwise dimension of said chute assembly is constant.

7. A chute assembly according to claim 5, wherein means hingedly connect said upper chute component to said lower chute component in said opening relation.

8. An angularly adjustable chute assembly and access means therefor comprising at least a pair of interconnected chute components, said chute components being interconnected in a manner such that the widthwise dimension of said chute assembly will remain constant, said chute components including an upper chute component and a lower chute component, said chute components being hingedly connected in opening relation, a chute connecting member acting in association with the hinged connection providing means for angularly adjusting said chute components, said access means including an opening in said lower chute component and a dual direction hingedly connected door provided to slidingly fit inside said opening, said door being functionable simultaneously as a part of said access means and as means for controlling the flow of articles through said chute assembly.

9. A chute connecting member comprising an outwardly curved front plate having a pair of opposing ends, a spaced apart pair of parallel opposing side plates provided at said opposing ends, each of said side plates provided at said opposing ends, each of said side plates being of a rearwardly tapering configuration to define a smaller free end having a flat vertical surface, the base of said front plate being provided with semiannular longitudinally oriented bead means for resting on one of a pair of associated adjacent chutes, and means for securing said front and side plates to each of said pair of chutes with said chute connecting member being disposed between said pair of chutes to connect said pair of chutes at a predetermined angle.

10. In combination a waste compactor and an angularly adjustable chute assembly and access means therefor, said waste compactor and chute assembly being in open connected relation, said chute assembly and access means therefor comprising at least a pair of interconnected chute components, said access means being provided in one of said chute components, said chute components including an upper chute component and a lower chute component, said lower chute component being disposed on said waste compactor, said chute components being adjacently disposed in opening relation, chute connecting means for angularly adjusting and interconnecting said upper and lower chute components in a manner such that the widthwise dimension of said chute assembly is constant, said chute connecting means including an outwardly curved front plate defining a curved inner surface for engaging an outer surface of one of said chute components in selected various positions to obtain a predetermined angle between said chute components, a spaced apart pair of parallel opposing side plates provided at opposing ends of said front plate, each of said side plates being of a rearwardly tapering configuration to define a smaller free end having a flat vertical surface, and means for securing said front and side plates on outer surfaces of said upper and lower chute components with said chute connecting means being disposed between said upper and lower chute components to connect said upper and lower chute components at said predetermined angle.

UNITED STATES PATENT OFFICE
CERTIFICATE OF CORRECTION

Patent No. 3,595,356                         Dated July 27, 1971

Inventor(s) DANIEL Q. BOJE and SOL KESTIN

It is certified that error appears in the above-identified patent and that said Letters Patent are hereby corrected as shown below:

Column 1, line 34, insert --interior of the--

Column 4, line 2, Claim 5, delete "an"

Column 4, line 34, Claim 9, delete "each of said side plates provided at said opposing ends"

Signed and sealed this 19th day of September 1972.

(SEAL)
Attest:

EDWARD M. FLETCHER, JR.                ROBERT GOTTSCHALK
Attesting Officer                      Commissioner of Patents